(12) United States Patent
Sun et al.

(10) Patent No.: US 8,428,467 B2
(45) Date of Patent: Apr. 23, 2013

(54) OPTICAL FIBER COMMUNICATION METHOD AND TRANSMITTING DEVICE

(75) Inventors: Nai-Hsiang Sun, Kaohsiung County (TW); Shih-Chiang Lin, Kaohsiung County (TW); Wen-Fung Liu, Kaohsiung County (TW); Jiun-Jie Liau, Kaohsiung County (TW)

(73) Assignee: I Shou University (TW)

( * ) Notice: Subject to any disclaimer, the term of this patent is extended or adjusted under 35 U.S.C. 154(b) by 347 days.

(21) Appl. No.: 12/814,596

(22) Filed: Jun. 14, 2010

(65) Prior Publication Data
US 2011/0135313 A1 Jun. 9, 2011

(30) Foreign Application Priority Data
Dec. 4, 2009 (TW) .............................. 98141527 A

(51) Int. Cl.
*H04B 10/00* (2006.01)
*H04B 10/12* (2006.01)

(52) U.S. Cl.
USPC ............................ 398/127; 398/131; 398/142

(58) Field of Classification Search .................. 398/127, 398/130, 131, 141, 142
See application file for complete search history.

(56) References Cited

U.S. PATENT DOCUMENTS

| | | | | |
|---|---|---|---|---|
| 4,760,569 | A * | 7/1988 | Mahlein | 398/139 |
| 5,974,212 | A * | 10/1999 | Saeki | 385/37 |
| 5,995,697 | A * | 11/1999 | Byron et al. | 385/128 |
| 6,321,001 | B1 * | 11/2001 | Heflinger | 385/24 |
| 6,766,078 | B1 * | 7/2004 | Canning | 385/37 |
| 2002/0191251 | A1 * | 12/2002 | Ferguson et al. | 359/139 |
| 2003/0142977 | A1 * | 7/2003 | Murgatroyd et al. | 398/25 |

OTHER PUBLICATIONS

Sun, et al., Second-Order Fiber Bragg Gratings, IEEE, 2009 (presented at OPTO Electronics and Communications Conference on Jul. 15, 2009).

* cited by examiner

*Primary Examiner* — Nathan Curs
(74) *Attorney, Agent, or Firm* — Reed Smith LLP

(57) ABSTRACT

An optical fiber communication method for communication between a transmitting terminal and a receiving terminal includes the steps of: providing an optical fiber to be coupled to the transmitting terminal and including a core that is provided with at least one second-order Bragg grating structure and a cladding that surrounds the core; configuring the transmitting terminal to output a data-carrying optical signal to one end of the core of the optical fiber for subsequent wireless transmission of the data-carrying optical signal via radiation through the second-order Bragg grating structure of the optical fiber; and configuring the receiving terminal to receive the signal radiated by the second-order Bragg grating structure of the optical fiber. A transmitting device is also disclosed.

4 Claims, 5 Drawing Sheets

OPTICAL FIBER COMMUNICATION METHOD AND TRANSMITTING DEVICE

CROSS-REFERENCE TO RELATED APPLICATION

This application claims priority of Taiwanese Application No. 098141527, filed on Dec. 4, 2009.

BACKGROUND OF THE INVENTION

1. Field of the Invention

This invention relates to an optical fiber communication method and a transmitting device, more particularly to an optical fiber communication method and a transmitting device using a second-order fiber Bragg grating structure.

2. Description of the Related Art

A fiber Bragg grating (FBG) is a type of Bragg grating formed in a core of an optical fiber, and is achieved on account of a periodically varying refractive index of the core. A first-order Bragg grating has a wavelength selection property, i.e., it reflects light in a narrow band around a Bragg wavelength and transmits light in all others. The Bragg wavelength is expressed in Equation 1 that follows:

$$\lambda_B = 2n_{eff}\Lambda \quad \text{(Equation 1)}$$

where $\lambda_B$ represents the Bragg wavelength, $n_{eff}$ represents an effective refractive index defined by the periodically varying refractive index of the first-order Bragg grating, and $\Lambda$ represents a period of variation of the periodically varying refractive index of the first-order Bragg grating.

A second-order Bragg grating has the aforesaid wavelength selection property, and further has a surface radiation property, i.e., it radiates light in a narrow band around a particular wavelength. The particular wavelength is expressed in Equation 2 that follows:

$$\lambda \approx \lambda_B = n_{eff}\Lambda \quad \text{(Equation 2)}$$

where $\lambda$ represents the particular wavelength, $\lambda_B$ represents the Bragg wavelength, $n_{eff}$ represents an effective refractive index defined by the periodically varying refractive index of the second-order Bragg grating, and $\Lambda$ represents a period of variation of the periodically varying refractive index of the second-order Bragg grating.

It is disclosed in U.S. Pat. No. 6,766,078 that the second-order Bragg grating can be applied in free space couplers, optical sensors, and suppression of ripples in dispersion compensators, etc.

SUMMARY OF THE INVENTION

Therefore, the object of the present invention is to provide an optical fiber communication method and a transmitting device that use a second-order Bragg grating structure to permit wireless propagation of an optical signal.

According to one aspect of this invention, there is provided an optical fiber communication method for communication between a transmitting terminal and a receiving terminal. The optical fiber communication method includes the steps of:

a) providing an optical fiber to be coupled to the transmitting terminal and including a core that is provided with at least one second-order Bragg grating structure and a cladding that surrounds the core, the second-order Bragg grating structure having a periodically varying refractive index that varies according to a period and that defines an effective refractive index, and permitting transmission, via radiation, of a signal with a wavelength that falls within a predetermined wavelength range, which is determined according to a product of the period and the effective refractive index;

b) configuring the transmitting terminal to output a data-carrying optical signal with a wavelength that substantially falls within the predetermined wavelength range to one end of the core of the optical fiber for subsequent wireless transmission of the data-carrying optical signal via radiation through the second-order Bragg grating structure of the optical fiber; and c) configuring the receiving terminal to receive the optical signal radiated by the second-order Bragg grating structure of the optical fiber.

According to another aspect of this invention, there is provided a transmitting device which includes an optical fiber and a converting unit. The optical fiber includes a core that is provided with at least one second-order Bragg grating structure and a cladding that surrounds the core. The second-order Bragg grating structure has a periodically varying refractive index that varies according to a period and that defines an effective refractive index, and permits transmission, via radiation, of a signal with a wavelength that falls within a predetermined wavelength range, which is determined according to a product of the period and the effective refractive index. The converting unit is coupled to the optical fiber, and is configured to convert a data-carrying electrical signal into a data-carrying optical signal having a wavelength that substantially falls within the predetermined wavelength range, and to output the data-carrying optical signal to one end of the core of the optical fiber for subsequent wireless transmission of the data-carrying optical signal via radiation through the second-order Bragg grating structure of the optical fiber.

BRIEF DESCRIPTION OF THE DRAWING

Other features and advantages of the present invention will become apparent in the following detailed description of the preferred embodiments of this invention, with reference to the accompanying drawings, in which.

DETAILED DESCRIPTION OF THE PREFERRED EMBODIMENT

Figure 1:
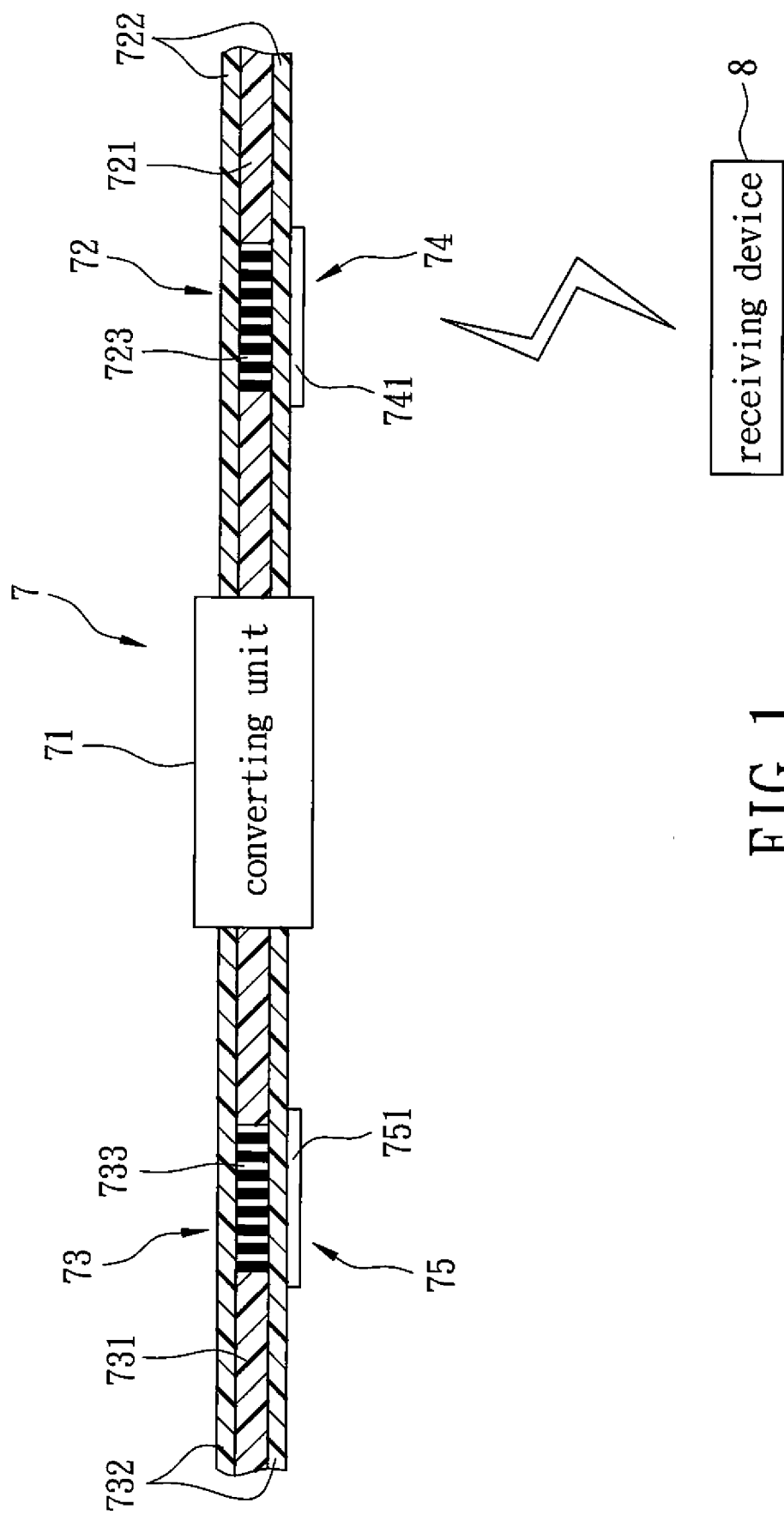
FIG. 1 is a schematic diagram illustrating a transmitting device according to the first preferred embodiment of this invention.

Before the present invention is described in greater detail with reference to the accompanying preferred embodiments, it should be noted herein that like elements are denoted by the same reference numerals throughout the disclosure.

Figure 2:
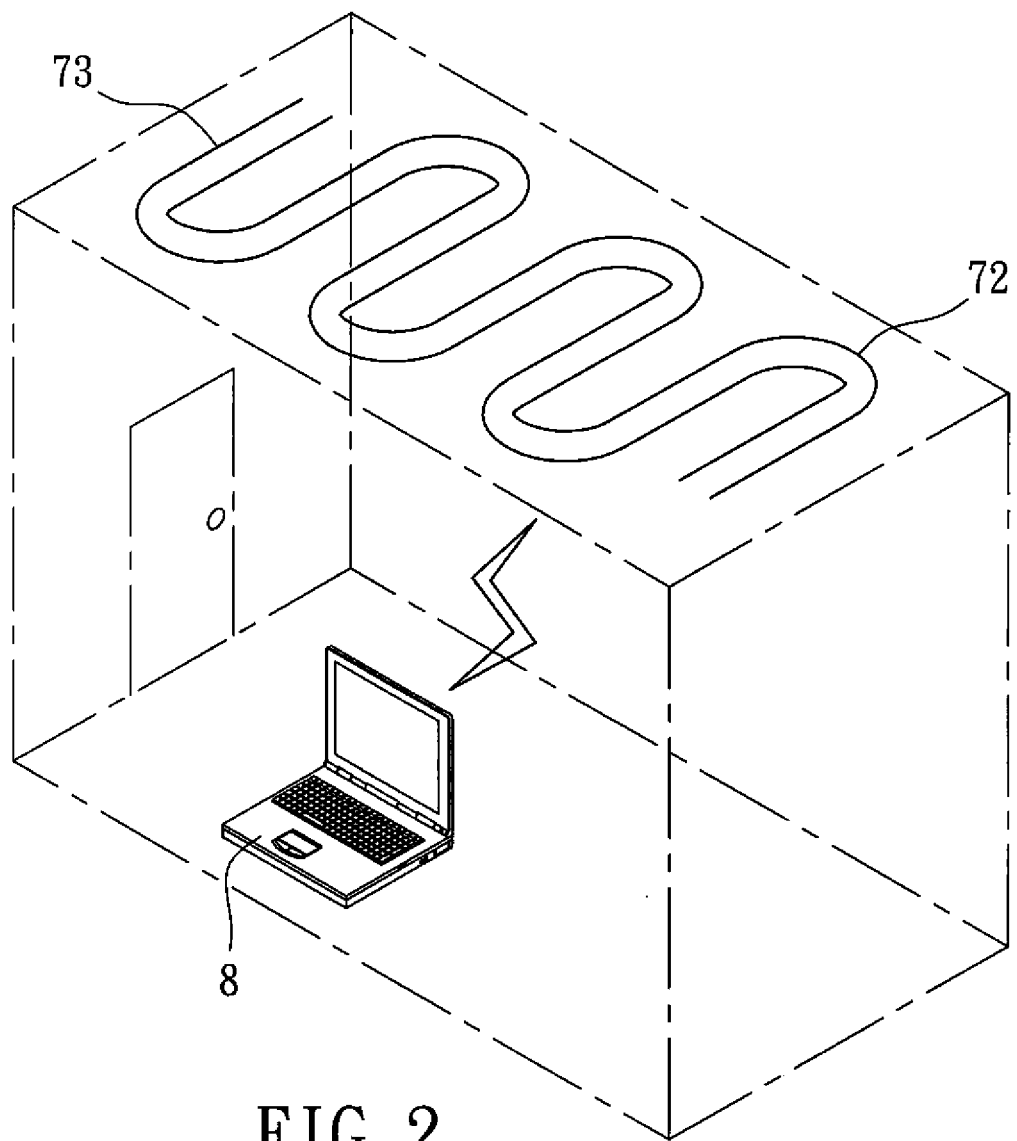
FIG. 2 is a schematic diagram illustrating an application of the transmitting device of FIG. 1.

Referring to FIGS. 1 and 2, a transmitting device 7 according to the first preferred embodiment of this invention includes a converting unit 71, a first optical fiber 72, a second optical fiber 73, a first light guide unit 74, and a second light guide unit 75.

Each of the first and second optical fibers 72, 73 includes a core 721, 731 that is provided with at least one second-order Bragg grating structure 723, 733, and a cladding 722, 732 that surrounds the core 721, 731. The second-order Bragg grating structure 723 of the first optical fiber 72 has a periodically varying refractive index that varies according to a first period and that defines a first effective refractive index, and permits transmission, via radiation, of a signal with a wavelength that falls within a first predetermined wavelength range, which is determined according to a product of the first period and the first effective refractive index. The second-order Bragg grating structure 732 of the second optical fiber 73 has a periodically varying refractive index that varies according to a second period and that defines a second effective refractive index, and permits transmission, via radiation, of a signal with a wavelength that falls within a second predetermined wavelength range, which is determined according to a product of the second period and the second effective refractive index. Preferably, the first and second optical fibers 72, 73 are photosensitive optical fibers, and the second predetermined wavelength range is different from the first predetermined wavelength range.

The converting unit 71 is coupled to the first and second optical fibers 72, 73, and is configured to convert a data-carrying electrical signal into first and second data-carrying optical signals having wavelengths that substantially fall within the first and second predetermined wavelength ranges, respectively, and to output the first and second data-carrying optical signals respectively to one end of the core 721 of the first optical fiber 72 and one end of the core 731 of the second optical fiber 73 for subsequent wireless transmission of the first and second data-carrying optical signals via radiation respectively through the second-order Bragg grating structures 723, 733 of the first and second optical fibers 72, 73.

The first light guide unit 74 includes at least one light guide 741 which is coupled to the first optical fiber 72 and configured to scatter the first data-carrying optical signal radiated by the second-order Bragg grating structure 723 of the first optical fiber 72. The second light guide unit 75 includes at least one light guide 751 which is coupled to the second optical fiber 73 and configured to scatter the second data-carrying optical signal radiated by the second-order Bragg grating structure 733 of the second optical fiber 73. In this embodiment, each of the light guides 741, 751 is implemented by a lens.

As a result, a receiving device 8 can receive at least one of the first and second data-carrying optical signals respectively radiated by the first and second optical fibers 72, 73 and respectively scattered by the first and second light guide units 74, 75, and can obtain data from the data-carrying optical signal (s) thus received.

In application, the first and second optical fibers 72, 73 can be disposed on the ceiling of a room or an office for radiating the first and second data-carrying optical signals. A user can use the receiving device 8 to receive at least one of the first and second data-carrying optical signals at any position in the room or the office for various purposes, such as wireless control of an electronic device.

Figure 3:
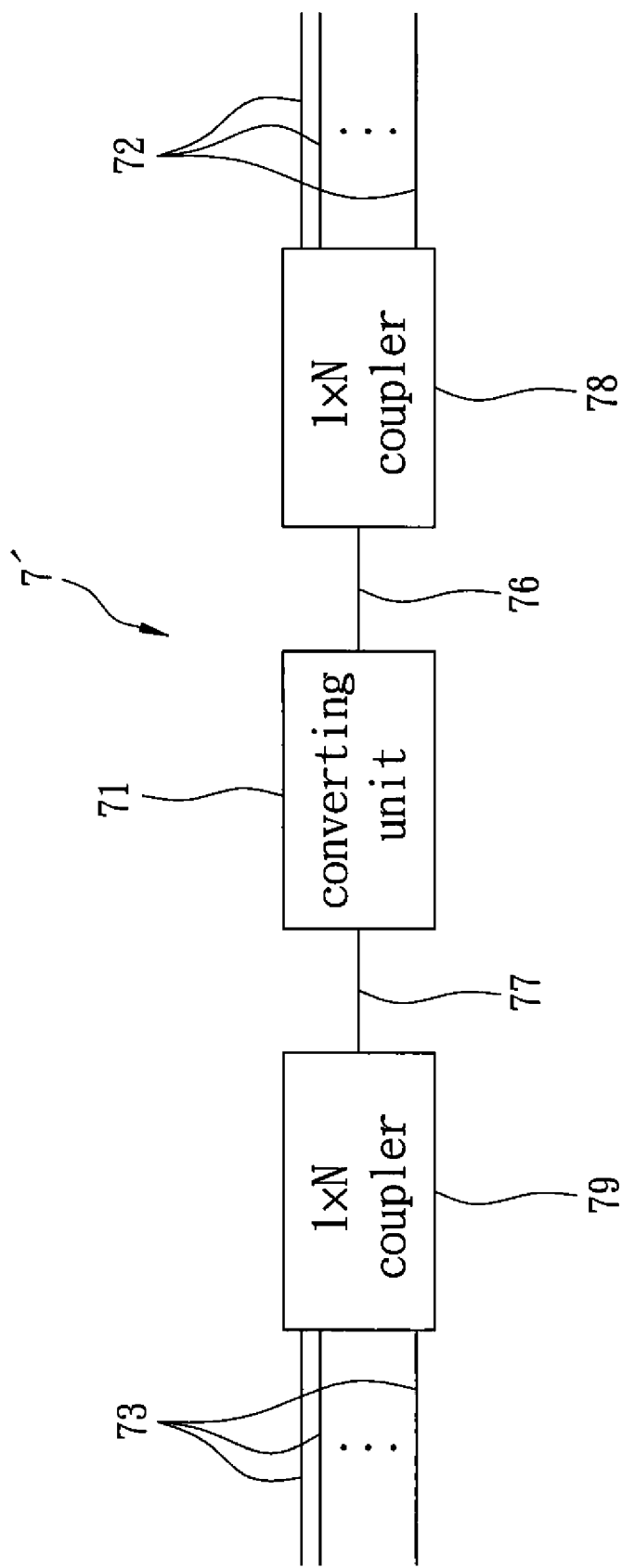
FIG. 3 is a schematic diagram illustrating a transmitting device according to the second preferred embodiment of this invention.
Figure 4:
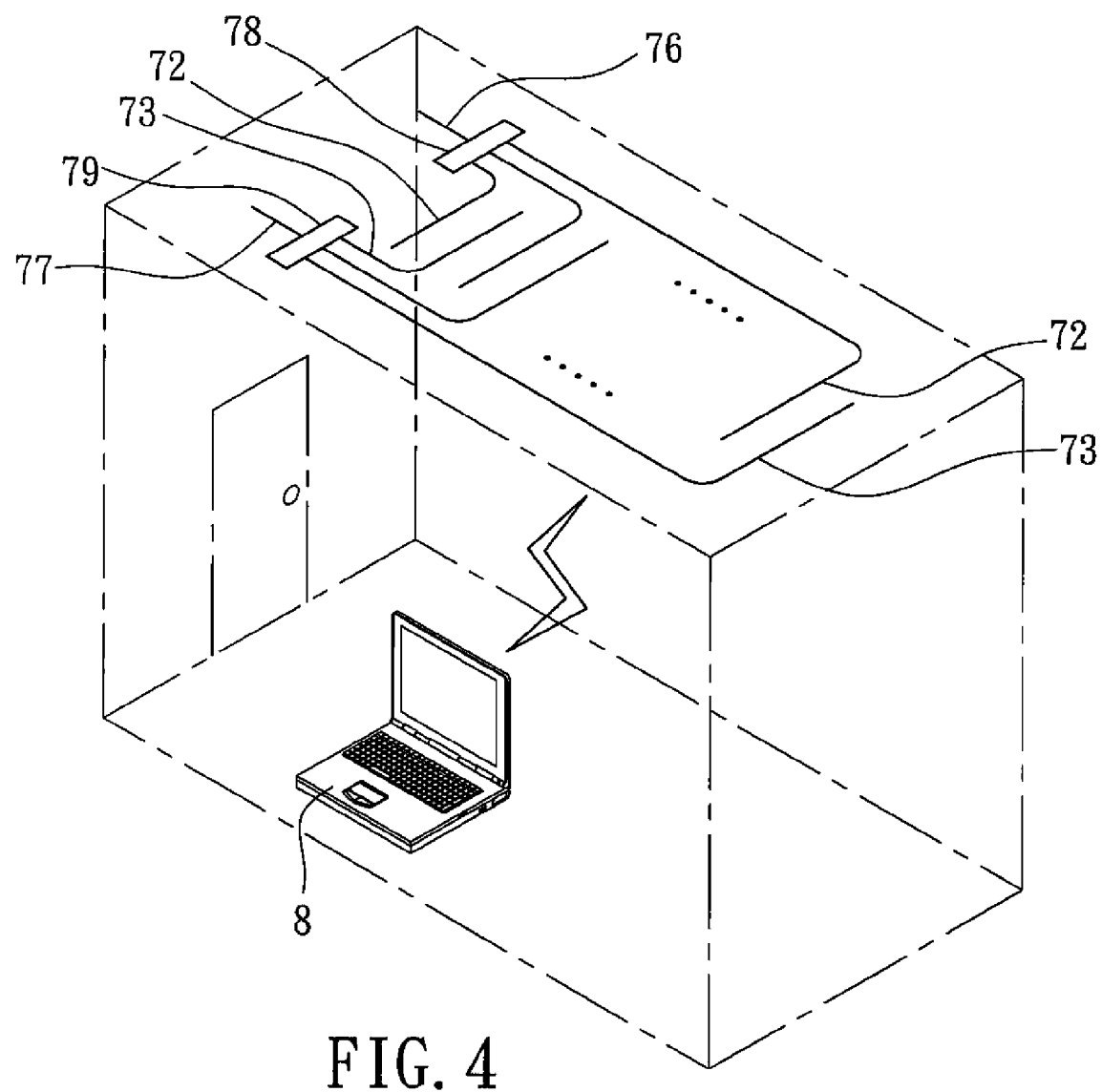
FIG. 4 is a schematic diagram illustrating an application of the transmitting device of FIG. 3.

Referring to FIGS. 3 and 4, a transmitting device 7' according to the second preferred embodiment of this invention differs from the first preferred embodiment in that the transmitting device 7' includes N number of the first optical fibers 72 and N number of the second optical fibers 73, where N is greater than one, and that the transmitting device 7' further includes a third optical fiber 76, a fourth optical fiber 77, a first 1×N coupler 78, and a second 1×N coupler 79.

In this embodiment, each of the third and fourth optical fibers 76, 77 includes a core (not shown) and a cladding (not shown) that surrounds the core. The first 1×N coupler 78 has an input terminal coupled to the third optical fiber 76, and N number of output terminals coupled respectively to the first optical fibers 72, and is capable of distributing a signal from the core of the third optical fiber 76 to the cores of the first optical fibers 72. The second 1×N coupler 79 has an input terminal coupled to the fourth optical fiber 77, and N number of output terminals coupled respectively to the second optical fibers 73, and is capable of distributing a signal from the core of the fourth optical fiber 77 to the cores of the second optical fibers 73. The converting unit 71 is coupled to the third and fourth optical fibers 76, 77, and is configured to output the first and second data-carrying optical signals respectively to the cores of the third and fourth optical fibers 76, 77 for subsequent wireless transmission of the first and second data-carrying optical signals via radiation respectively through the second-order Bragg grating structures of the first and second optical fibers 72, 73 after respectively passing from the first and second 1×N couplers 78, 79 to the cores of the first and second optical fibers 72, 73.

In application, the first, second, third and fourth optical fibers 72, 73, 76, 77 and the first and second 1×N couplers 78, 79 can be disposed on the ceiling of a room or an office for radiating the first and second data-carrying optical signals.

Figure 5:
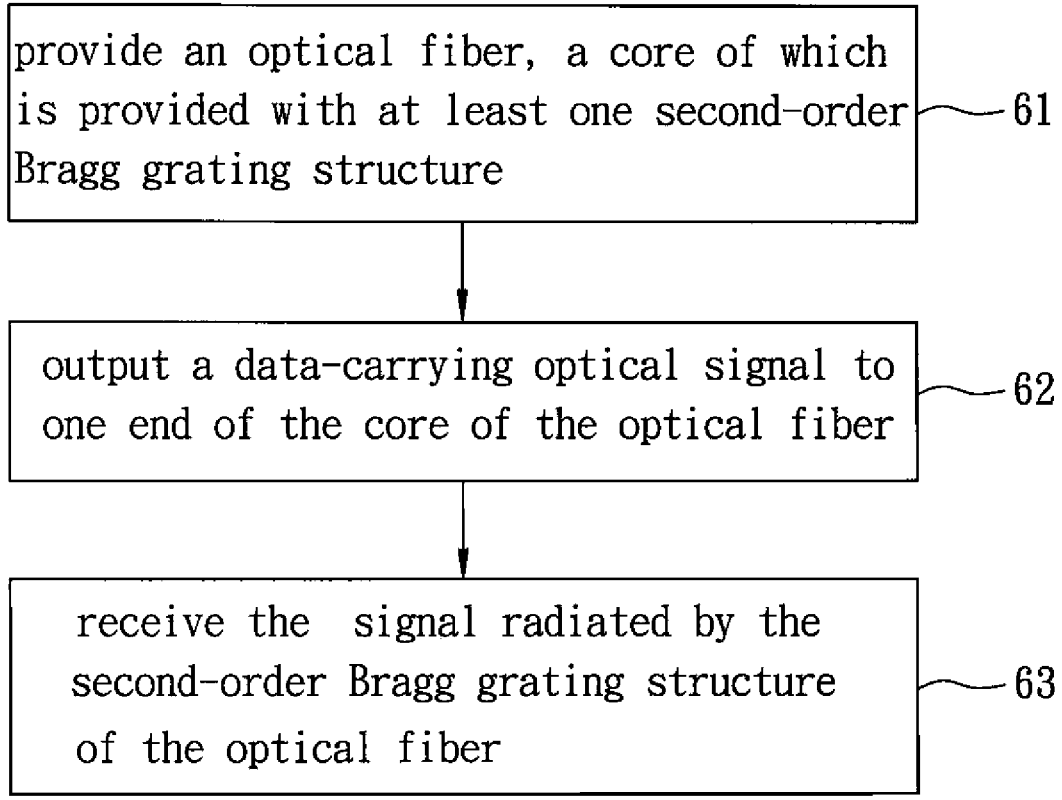
FIG. 5 is a flow chart illustrating an optical fiber communication method according to the preferred embodiment of this invention.

Referring to FIG. 5, in combination with FIG. 1, an optical fiber communication method according to the preferred embodiment of this invention is for communication between a transmitting terminal, such as the converting unit 71 of FIG. 2, and a receiving terminal, such as the receiving device 8 of FIG. 2, and includes the following steps.

In step 61, an optical fiber 72 is provided. The optical fiber 72 is to be coupled to the transmitting terminal 71, and includes a core 721 that is provided with at least one second-order Bragg grating structure 723 and a cladding 722 that surrounds the core 721. The second-order Bragg grating structure 723 has a periodically varying refractive index that varies according to a period and that defines an effective refractive index, and permits transmission, via radiation, of a signal with a wavelength that falls within a predetermined wavelength range, which is determined according to a product of the period and the effective refractive index. Preferably, the optical fiber 72 is a photosensitive optical fiber.

In step 62, the transmitting terminal 71 is configured to output a data-carrying optical signal with a wavelength that substantially falls within the predetermined wavelength range to one end of the core 721 of the optical fiber 72 for subsequent wireless transmission of the data-carrying optical signal via radiation through the second-order Bragg grating structure 723 of the optical fiber 72.

In step 63, the receiving terminal 8 is configured to receive the signal radiated by the second-order Bragg grating structure 723 of the optical fiber 72 so as to obtain data from the received signal.

In summary, by providing a second-order Bragg grating structure 723, 733 in the core 721, 731 of the optical fiber 72, 73, the present invention allows for wireless transmission of the data-carrying optical signals through the optical fibers 72, 73.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A transmitting device, comprising:
a first optical fiber including a core that is provided with at least one second-order Bragg grating structure and a cladding that surrounds said core, said second-order Bragg grating structure having a periodically varying refractive index that varies according to a first period and that defines a first effective refractive index, and permitting transmission, via radiation, of a signal with a wavelength that falls within a first predetermined wavelength range, which is determined according to a product of the first period and the first effective refractive index;
a converting unit coupled to said first optical fiber, and configured to convert a data-carrying electrical signal into a first data-carrying optical signal having a wavelength that substantially falls within the first predetermined wavelength range, and to output the first data-carrying optical signal to one end of said core of said first optical fiber for subsequent wireless transmission of the first data-carrying optical signal via radiation through said second-order Bragg grating structure of said first optical fiber; and
a light guide unit coupled to said first optical fiber, and configured to scatter the first data-carrying optical signal radiated by said second-order Bragg grating structure of said first optical fiber.

2. The transmitting device of claim 1, wherein said first optical fiber is a photosensitive optical fiber.

3. A transmitting device, comprising:
a first optical fiber including a core that is provided with at least one second-order Bragg grating structure and a cladding that surrounds said core, said second-order Bragg grating structure having a periodically varying refractive index that varies according to a first period and that defines a first effective refractive index, and permitting transmission, via radiation, of a signal with a wavelength that falls within a first predetermined wavelength range, which is determined according to a product of the first period and the first effective refractive index;
a converting unit coupled to said first optical fiber, and configured to convert a data-carrying electrical signal into a first data-carrying optical signal having a wavelength that substantially falls within the first predetermined wavelength range, and to output the first data-carrying optical signal to one end of said core of said first optical fiber for subsequent wireless transmission of the first data-carrying optical signal via radiation through said second-order Bragg grating structure of said first optical fiber; and
a second optical fiber including a core that is provided with at least one second-order Bragg grating structure, and a cladding that surrounds said core, said second-order Bragg grating structure having a periodically varying refractive index that varies according to a second period and that defines a second effective refractive index, and permitting transmission, via radiation, of a signal with a wavelength that falls within a second predetermined wavelength range, which is determined according to a product of the second period and the second effective refractive index;
wherein said converting unit is further coupled to said second optical fiber, and is further configured to convert the data-carrying electrical signal into a second data-carrying optical signal having a wavelength that substantially falls within the second predetermined wavelength range, and to output the second data-carrying optical signal to one end of said core of said second optical fiber for subsequent wireless transmission of the second data-carrying optical signal via radiation through said second-order Bragg grating structure of said second optical fiber, the second predetermined wavelength range being different from the first predetermined wavelength range.

4. The transmitting device of claim 3, wherein said first optical fiber is a photosensitive optical fiber.

* * * * *